United States Patent [19]
Newcombe et al.

[11] Patent Number: 6,058,177
[45] Date of Patent: May 2, 2000

[54] MECHANISM TO SUPPORT MULTIPLE VERSIONS OF TOLL FREE SERVICE

[75] Inventors: Edmund Alexander Newcombe, Ottawa; Slobodanka Dundjreovic Vidakovic, Nepean, both of Canada

[73] Assignee: Nortel Networks Corporation, Montreal, Canada

[21] Appl. No.: 08/897,603

[22] Filed: Jul. 21, 1997

[51] Int. Cl.$^7$ ...................................................... H04M 3/42
[52] U.S. Cl. ........................... 379/210; 379/207; 379/220
[58] Field of Search .................................. 379/207, 219, 379/220, 222, 242, 243, 244, 201, 210, 211, 221, 233

[56] References Cited

U.S. PATENT DOCUMENTS

| | | | |
|---|---|---|---|
| 4,924,510 | 5/1990 | Le ............................................. | 379/221 |
| 5,905,505 | 3/1992 | Finucane et al. ........................ | 379/201 |
| 5,937,053 | 8/1999 | Lee et al. ................................. | 379/220 |

OTHER PUBLICATIONS

"Switching and Signaling Generic Requirements for Toll–Free Service Using AIN" *GR–2892–CORE* Bellcore (1995).
"AINGR: Switching Systems Section 1–8" *GR–1298–CORE* Bellcore (1996).
"Technical Reference Notice of Disclaimer" *TR–NWT–000533* (1995).
"AIN 0.1 SSP Functions" *TR–NWT–001284* (1992).

*Primary Examiner*—Krista Zele
*Assistant Examiner*—Bing Bui

[57] ABSTRACT

An apparatus for selecting telephone service types on a subscriber line in response to a called number of a telephone call on the subscriber line, the called number including a number plan area code and a central office code. The apparatus includes a service switching point having subscriber line termination equipment for terminating the subscriber telephone line. The subscriber line termination equipment has a called number buffer for receiving and storing a called telephone number from the subscriber telephone line in response to the telephone call on the subscriber telephone line. The apparatus further includes a processor in communication with the called number buffer and programmed to read the numbering plan area code from the called number buffer and to determine whether or not the numbering plan area code meets a first criteria, to process the call according to a first call model associated with a first telephone service type, when the numbering plan area code meets the first criteria, to terminate processing according to the first call model when at least a portion of the numbering plan area code and at least a portion of the central office code of the called number meet a second criteria, to assign a dummy routing code to the call, the dummy routing code being operable to control call processing under a second call model associated with a second telephone service type, and to process the call according to the second call model.

13 Claims, 4 Drawing Sheets

P - NPA - NNX - XXXX
- 24
- 26
- 28
- 30

Fig. 2

AIN RANGE TABLE —36

| NPA (40) | NNX | (36) |
|---|---|---|
| | FROM (41) | TO (42) |
| 800 | 000 | 223 |
| 888 | 507 | 789 |
| 866 | 000 | 223 |
| 822 | 010 | 227 |

Fig. 3

AIN TRIGGER DIGITS TABLE —38

MECHANISM TO SUPPORT MULTIPLE VERSIONS OF TOLL FREE SERVICE

FIELD OF THE INVENTION

This invention relates to toll free telephone services offered in simultaneous compliance with the Bellcore GR-2892-CORE and GR-1298-CORE specifications, and the Bellcore TR-NWT-000533 specification.

BACKGROUND OF THE INVENTION

In the Bellcore GR-2892-CORE and GR-1298-CORE specifications, advanced intelligent network (AIN) toll free service based on a 3 or 6 digit trigger must be able to take precedence over conventional 3-digit Bellcore TR-NWT-000533 based intelligent network (IN) toll free service. However, in the GR-1298-CORE specification IN toll-free service checking must occur earlier in the call model than the check for AIN toll free service. As a result, if a numbering plan area code of a called number is subject to IN toll free service, the IN toll free service would be invoked before a more specific 6-digit AIN trigger is encountered. Thus, AIN and IN toll free services cannot simultaneously be offered at the same service switching point. The arrangement of existing programming to provide AIN and IN services is such that rearrangement of processing steps in either of the call models would remove the call models from compliance with the Bellcore specifications, affecting many other call processing functions and features. Therefore, it would be desirable to simultaneously offer call processing based on the AIN call model and the IN call model without departing from the Bellcore specifications as this would facilitate user transition from the Bellcore TR-NWT-000533 specification to the Bellcore GR-2892-CORE and GR-1298-CORE specifications in a manner transparent to users.

SUMMARY OF THE INVENTION

In accordance with one aspect of the invention, there is provided a method of selecting telephone service types on a subscriber line in response to a called number of a telephone call on the subscriber line, the called number including a number plan area code and a central office code. The method includes the steps of:

a) processing the call at a service switching point connected to the subscriber line, according to a first call model associated with a first telephone service type when the called number has a numbering plan area code meeting a first criteria;
b) terminating processing of the call according to the first call model when at least a portion of the numbering plan area code and at least a portion of the central office code meet a second criteria;
c) assigning a dummy routing code to the call, the dummy routing code being operable to control call processing under a second call model associated with a second telephone service type; and
d) re-initiating processing of the call at the service switching point, according to the second call model.

In accordance with another aspect of the invention, there is provided a method of selecting telephone service types on a subscriber line in response to a called number of a telephone call on the subscriber line, the called number including a number plan area code and a central office code, the method including the steps of:

a) processing the call at a service switching point connected to the subscriber line, according to a first call model associated with a first telephone service type when the called number has a numbering plan area code meeting a first criteria;
b) terminating processing of the call according to the first call model when at least a portion of the numbering plan area code and at least a portion of the central office code meet a second criteria;
c) assigning a dummy routing code to the call, the dummy routing code being operable to control call processing under a second call model associated with a second telephone service type; and
d) re-directing the call processing to proceed according to the second call model.

Preferably, the method includes the step of initiating call processing according to the first call model when the numbering plan area code matches a predefined value.

Preferably, the method includes the step of terminating call processing according to the first call model and continuing call processing according to the second call model when the called number includes a sequence of digits within at least one predefined range of digits.

Preferably, the method includes the step of terminating call processing according to the first call model and initiating call processing according to the second call model when the numbering plan area code is equal to a predefined value and the called number includes a sequence of digits within a predetermined range.

Preferably, the method includes the step of assigning a dummy code operable to permit the call processing to proceed through a call checking algorithm of the second call model.

Preferably, the method includes the step of re-directing the call to the second call model at a point in the second call model after a number to route translation function in the second call model.

In accordance with another aspect of the invention, there is provided an apparatus for selecting telephone service types on a subscriber line in response to a called number of a telephone call on the subscriber line, the called number including a number plan area code and a central office code. The apparatus includes a service switching point having subscriber line termination equipment for terminating the subscriber telephone line. A called number buffer is located in the subscriber line termination equipment for receiving and storing a called telephone number from the subscriber telephone line in response to the telephone call on the subscriber telephone line. The apparatus further includes a processor in communication with the called number buffer and programmed to:

i) read the numbering plan area code from the called number buffer and to determine whether or not the numbering plan area code meets a first criteria;
ii) process the call according to a first call model associated with a first telephone service type, when the numbering plan area code meets the first criteria;
iii) terminate processing according to the first call model when at least a portion of the numbering plan area code and at least a portion of the central office code of the called number meet a second criteria;
iv) assign a dummy routing code to the call, the dummy routing code being operable to control call processing under a second call model associated with a second telephone service type; and
v) process the call according to the second call model.

Preferably, the processor is programmed to initiate call processing according to the first call model when the numbering plan area code matches a predefined value.

Preferably, the processor is programmed to terminate call processing according to the first call model and continue call processing according to the second call model when the called number includes a predefined sequence of digits within at least one predefined range of digits.

Preferably, the processor is programmed to terminate call processing according to the first call model and continue call processing according to the second call model when the numbering plan area code and the numbering plan area co de is equal t o a predefined value and the called numbering includes a sequence of digits within a predetermined range.

Preferably, the processor is programmed to associate with the call a dummy code operable to permit the call processing to proceed through a call checking algorithm of the second call model.

Preferably, the processor is programmed t o re-direct the call to the second call model at a point in the second call model after a number to route translation function in the second call model.

The present invention allows present programming of IN and AIN functional blocks to remain intact and in compliance with Bellcore specifications, while allowing a higher resolution of toll-free services between AIN and IN to be provided to the user. An end office service switching point requires no changes in existing IN toll free datafill when AIN toll free service is introduced.

BRIEF DESCRIPTION OF THE DRAWINGS

In drawings which illustrate embodiments of the invention,

FIG. 2 is a schematic representation of a telephone number format used in accordance with the first embodiment of the invention;

FIG. 3 is a schematic representation of an advanced intelligent network range table according to the first embodiment of the invention;

FIG. 4 is a schematic representation of an advanced intelligent network trigger digits table according to the first embodiment of the invention;

DETAILED DESCRIPTION

FIG. 1

Figure 1:
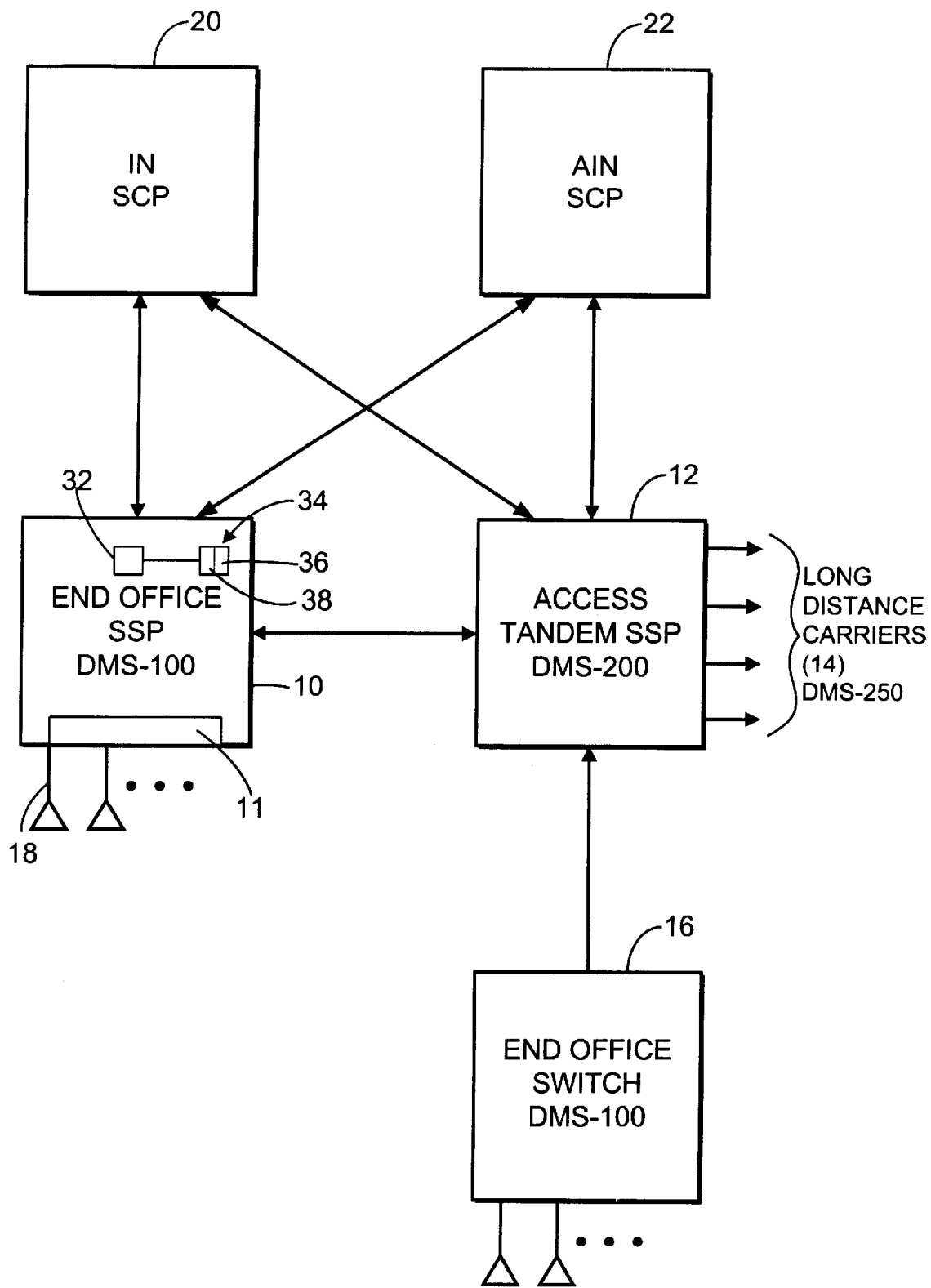
FIG. 1 is a block diagram of an apparatus according to a first embodiment of the invention.

Referring to FIG. 1, an apparatus according to a first embodiment of the invention is shown generally at 10. The apparatus includes an end office service switching point (SSP), which, in this embodiment is a first, end office digital switch, known as a DMS100 manufactured by Northern Telecom of Montreal, Canada. The apparatus is part of a serving area of a local exchange carrier. The serving area includes the apparatus 10 and further includes an access tandem SSP 12, which is connected to a plurality of long distance carriers 14 and at least one other or second end office switch 16. The second end office 16 is similar to the first end office depicted as apparatus 10.

The first end office SSP 10 has conventional subscriber line termination equipment 11 connected to a plurality of individual telephone subscriber lines 18 for terminating said subscriber lines at the first end office. The end office SSP 10 is in communication with the access tandem SSP 12 and is operable to route a plurality of telephone calls thereto. The first end office SSP 10 and access tandem SSP 12 are each individually in communication with Intelligent Network (IN) and Advanced Intelligent Network (AIN) service control points 20 and 22 respectively. The IN and AIN service control points 20 and 22 include databases appropriate to the Bellcore TR-NWT-000533 and GR-2892-CORE specifications respectively and are operable to receive query messages from the end office SSP 10 and access tandem SSP 12 and to provide response messages in return. The query messages are in the form of an identification of the subscriber line 18 associated with the query and a telephone number called on the subscriber line 18. The response messages from the IN and AIN service control points 20 and 22 are in the form of a telephone number and codes defining additional information describing how to route and bill the call. This additional information differs between the Bellcore TR-NWT-000533 and GR-2892-CORE specifications.

FIG. 2

It will be appreciated that when a subscriber makes a telephone call, the telephone number dialled or called is in a format shown in FIG. 2. This format includes a prefix (P) digit 24, a three digit numbering plan area (NPA) code 26, a three digit central office code (NNX) 28 and a four digit station code (XXXX) 30. Thus, the called number includes a number plan area code and a central office code.

Referring back to FIG. 1, the first end office SSP 10 includes a processor 32 operable to run a sequence of program instruction codes for directing the processor to process the call according to a first or second call model, the first call model being associated with a first type of telephone service described by TR-NWT-000533 and the second call model being associated with a second type of telephone service described by GR-2892-CORE. The selection of which telephone service type is used to process the call is made on the basis of the numbering plan area code and central office code of the called number.

The processor 32 includes memory 34 in which is stored an advanced intelligent network (AIN) range table 36 and an AIN trigger digits table 38.

FIG. 3

Referring to FIG. 3, the AIN range table 36 includes first, second and third columns 40, 41, 42, the first column 40 including number plan area fields, the second and third columns 41 and 42 including fields specifying a range of office codes associated with the corresponding number plan area code from the first column 40. The AIN range table is used to associate a range of dialled numbers with an AIN service. Thus, in the example shown, an 800 number within the range of between 000 and 223 is considered to be subject to AIN processing at the end office SSP 10, shown in FIG. 1.

FIG. 4

Referring to FIG. 4, the AIN trigger digits table 38 includes a plurality of multi-digit trigger digit codes, one of which is shown at 44, which identify specific trigger digit strings which will invoke the AIN service at the end office SSP 10.

FIG. 5

Figure 5:
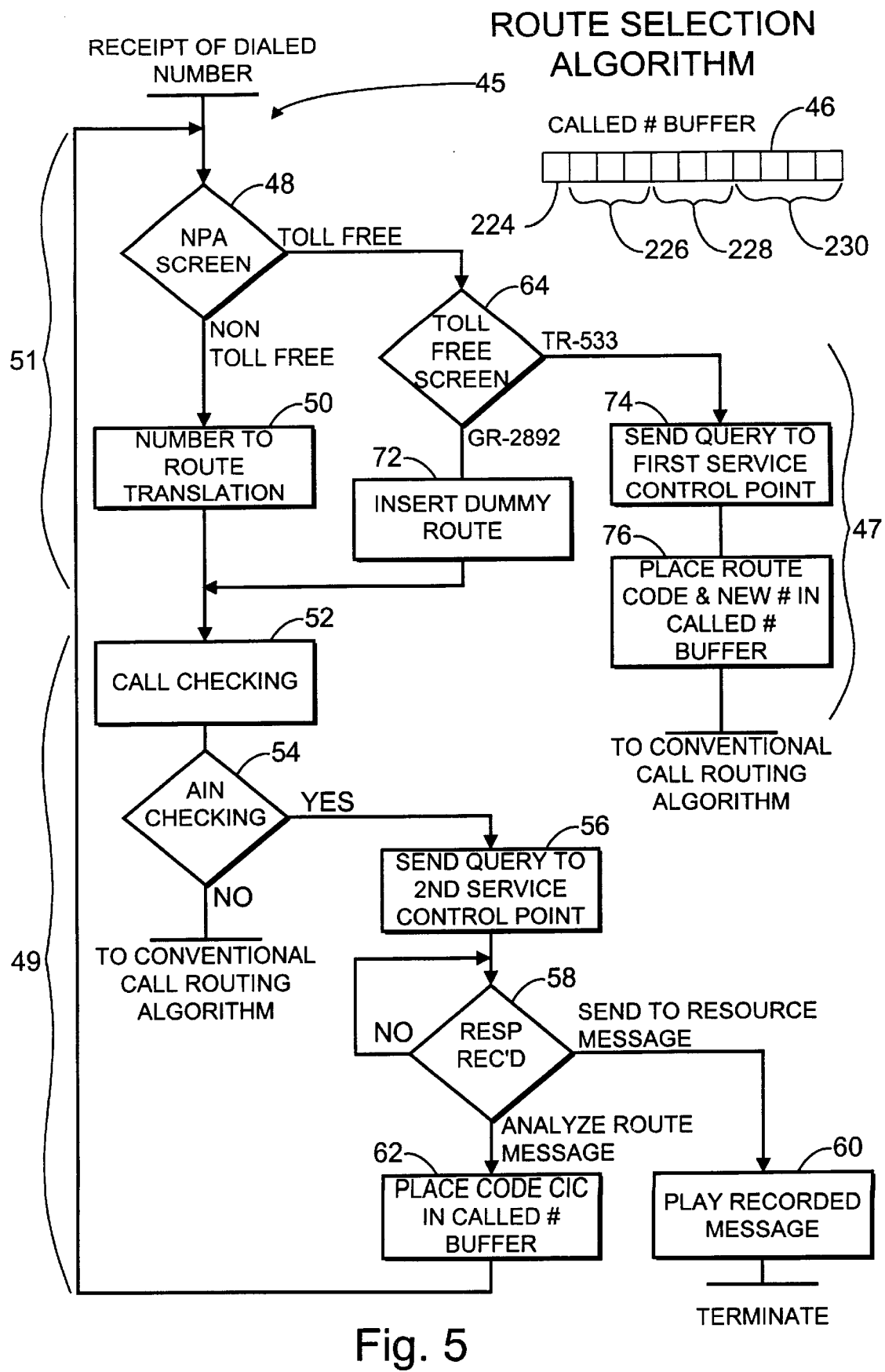
FIG. 5 is a flowchart depicting a route selection algorithm according to the first embodiment of the invention.

Referring to FIGS. 1 and 5, the processor 32 runs a route selection algorithm shown generally at 45 in FIG. 5. Blocks of code implementing the route selection algorithm are invoked by the processor 32 upon receipt of a dialled number from one of the subscriber lines 18.

The subscriber line termination equipment 11 has a called number buffer 46 having a prefix portion 224, an NPA code portion 226, a central office (CO) code portion 228 and a station portion 230, for receiving and storing respective corresponding portions of a dialled number, dialled on the subscriber line at the beginning of a telephone call thereon.

Upon receipt of a dialled number in the called number buffer, the processor 32 is directed to run the blocks of code implementing the route selection algorithm. The route selection algorithm includes first and second portions 47 and 49 which are part of the first and second call models respectively. In addition, the route selection algorithm has a third portion 51 which is also part of the first call model. The algorithm begins with a first block 48 which directs the processor to communicate with the called number buffer 46 to locate the NPA digit portion of the dialled number in the called number buffer and compare it against an NPA screening list (not shown) of toll-free NPAs, as defined by the local exchange carrier. Thus, the processor reads the numbering plan area code from the called number buffer and determines whether or not the numbering plan area code meets a first criteria, ie., does it match a predefined value on the NPA screening list. The processor also processes the call according to the first call model associated with the first telephone service type, when the numbering plan area code meets the first criteria. If the NPA is not located on the NPA screening list, block 50 directs the processor to perform a number-to-route translation, as specified by the local exchange carrier and to associate a route code with the call. Block 52 then directs the processor to perform further call checking, again as specified by the local exchange carrier.

Block 54 then directs the processor 32 to perform an AIN specific digit string checking function. To do this, the processor attempts to locate a specific digit string in the AIN trigger digits table 38 shown in FIG. 4, matching the NPA code and the central office code 28 in the called number buffer 46. If no match is found, the route selection algorithm is ended and processing continues according to a conventional call routing algorithm (not shown), executed by the processor 32.

In the event that there is a match in the AIN trigger digits table 38, block 56 directs the processor 32 to send a query to the AIN service control point 22, according to the Bellcore GR-2892-CORE specification. The service control point processes the request according to that specification and returns a response message accordingly. Block 58 directs the processor to wait until the response message is received. The response message may occur in an analyze-route form or a send-to-resource message form. If a send-to-resource message is received, block 60 directs the processor 32 to connect to a resource such as a recorded announcement service, rather than routing the call. The route selection algorithm is then terminated.

At block 58, if an analyze route message is received, block 62 directs the processor 32 to place a carrier identification code (CIC) and phone number or route code and phone number in the called number buffer. The analyze-route message contents determine the code used. If a route code is present in the analyze route message, it will be used first (even if a carrier code is present). If a route code is absent but a carrier code is present, the carrier code is used. If neither is present the call is blocked.

Upon completion of block 62, the processor is directed to continue processing again at block 48, the NPA screen, and processing continues as described above.

If at block 48, the processor determines that the contents of the called number buffer 46 are found on the NPA screening list and thereby identify a toll-free service, block 64 directs the processor 32 to perform a toll-free screening function.

FIG. 6

Figure 6:
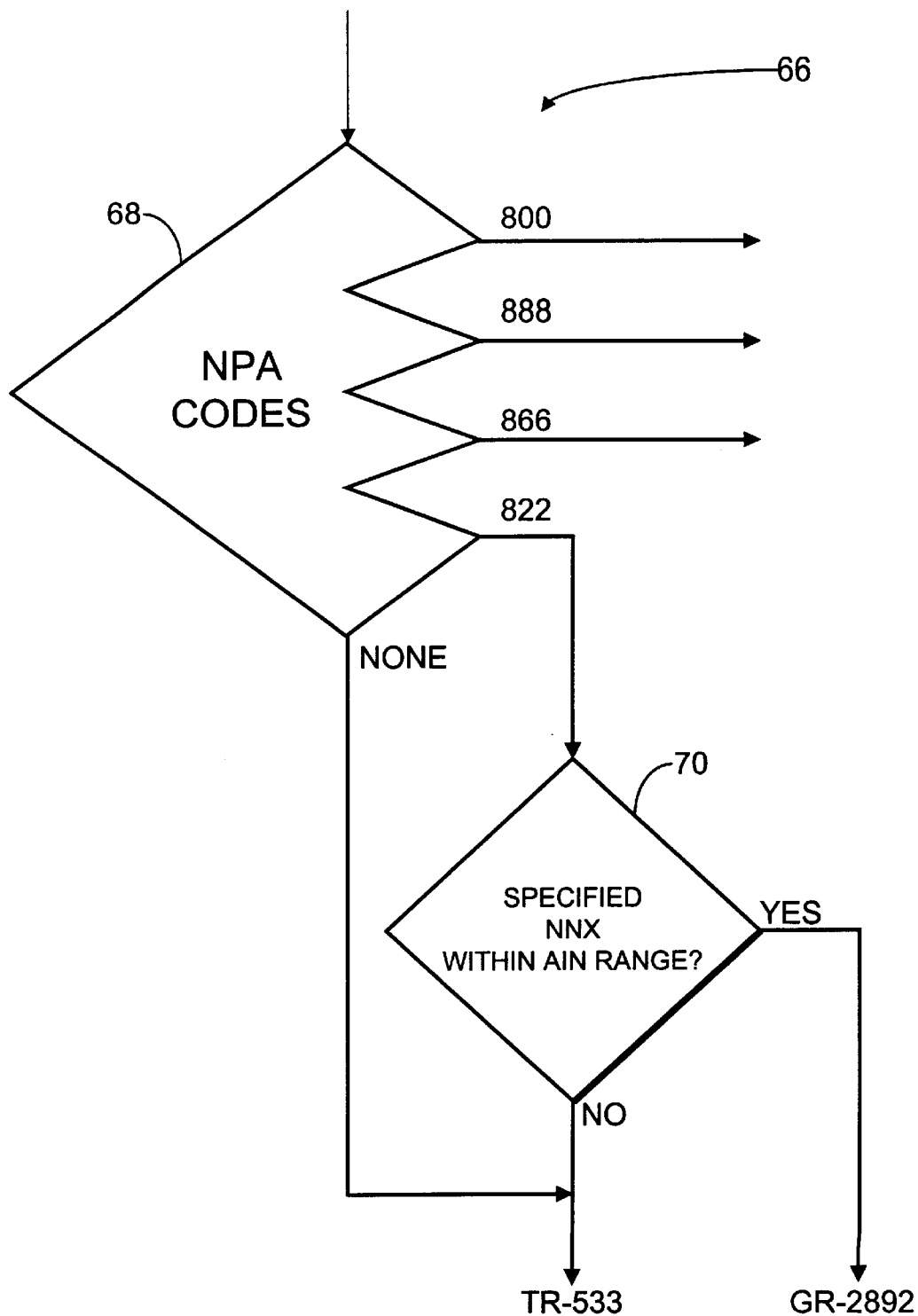
FIG. 6 is a portion of a flowchart depicting a toll free screening function according to the first embodiment of the invention.

Referring to FIGS. 1 and 6, a toll-free screening function sub-algorithm for implementing the toll-free screening function is shown generally at 66. This sub-algorithm is implemented by code which directs the processor 32 to determine whether or not a plurality of pre-specified or predefined NPA codes are found in the NPA portion 226 of the called number buffer 46 and to determine whether or not specific digits in the office code portion 228 are within one of the ranges specified in the AIN range table shown at 36 in FIG. 3, and, in response to select processing of the call according to Bellcore specification TR-NWT-000533 or GR-2892-CORE.

The toll-free screening function algorithm begins with a first block 68 which directs the processor to compare the contents of the NPA portion 226 of the called number buffer 46 with the contents of the first column 40 of the AIN range table 36 shown in FIG. 3. When the numbering plan area code is equal to one of the predefined values on the first column, the processor is directed to branch to one of a plurality of AIN range table blocks, one of which is shown at 70, for directing the processor to determine whether or not the CO code portion of the called number is within a predefined range. Each range table block is associated with a respective NPA, the one shown corresponding to NPA code 822.

In the event that the NPA portion 226 of the called number buffer 46 fails to match any of the NPA codes in the AIN range table 36, block 68 is ended and call processing continues according to the Bellcore TR-NWT-000533 specification, partially depicted at blocks 74 and 76 in FIG. 5. In other words, call processing continues according to the first call model.

In the event that the NPA code does match one of the specified toll-free NPA codes in the AIN range table 36, a respective block, in this example block 70, directs the processor to determine whether or not the CO code portion 228 of the called number buffer 46 is within the corresponding range specified in the AIN range table 36 shown in FIG. 3. For example, if the NPA code portion of the called number buffer contains the value 800, block 70 directs the processor to determine whether or not the office code portion 228 is within the range of 000–223. In other words, the office code portion is tested against a second criteria, the second criteria being whether or not the office code is within a predefined range of digits. In the event that the office code portion is not within an indicated range for the specified NPA string, call processing continues according to the Bellcore TR-NWT-000533 specification. In the event that the office code portion is within a specified AIN range, call processing continues according to the Bellcore GR-2892-CORE specification, whereupon processing continues at block 72 of FIG. 5. Thus, processing of the call according to the first call model is terminated and the call is processed according to the second call model when the numbering plan area code is equal to a predefined value and the called number includes a sequence of digits within a predetermined range in other words, when at least a portion of the numbering plan area code and at least a portion of the central office code meet a second criteria.

Processing the call according to the GR-2892-CORE specification involves directing the processor to block 72 which directs the processor to associate a dummy routing code to the call, the dummy routing code meeting local exchange carrier criteria for further call checking and routing inside the switch. AIN checking takes precedence over such routing. This allows the call to pass call checking at block 52 under the second call model, to reach block 54 which performs AIN specific digit string checking and the remaining functions of the Bellcore GR-2892-CORE specifications. The dummy routing code is also selected such that if the processor 32 manages to reach the point of entry to the call routing algorithm, call processing will be terminated and an indication is provided to the user to signify that the call could not be completed. Thus, a dummy routing code is assigned to the call, the dummy routing code being operable to control call processing under the second call model. In addition, after the dummy routing code is assigned and processing returns to block 52, processing of the call is effectively re-initiated under the second call model. In other words, the call has been redirected to proceed according to the second call model.

When, at block 64, the processor is directed to continue processing according to the Bellcore TR-NWT-000533 specification, block 64 is followed by block 74 which directs the processor 32 to send a query message to the IN service control point 20, the message having a format according to the Bellcore TR-NWT-000533 specification. The IN service control point 20 sends a response message back to the processor 32, this response message including a route code and number. Block 76 then directs the processor to place the route code and the number into the called number buffer 46 and processing continues according to conventional call routing algorithms.

It is an advantage of the invention that in a telephone network of the type shown in FIG. 1, an intelligent network (IN) database according to the Bellcore TR-533 specification and an advanced intelligent network (AIN) according to the Bellcore GR-2892-CORE specification can be used to provide toll-free telephone service. In particular, the advanced intelligent network toll-free service can be added to an existing intelligent network toll-free service to extend the capabilities of the existing system.

In effect the NPA screen 48 acts as a relatively coarse filter to filter out toll-free calls and toll-free screening block 64 acts as a relatively fine filter to filter out toll-free calls within specific numerical ranges. Toll-free calls within specific numerical ranges are given a dummy routing code which allows the call to proceed along a generic call processing path to a first query point where further call processing information is associated with the call to facilitate routing. Toll-free calls outside of said specific numerical ranges proceed to a second query point on a specific call processing path, and further call processing information is associated with the call to facilitate routing.

While specific embodiments of the invention have been described and illustrated, such embodiments should be considered illustrative of the invention only and not as limiting the invention as construed in accordance with the accompanying claims.

What is claimed is:

1. A method of selecting telephone service types on a subscriber line in response to a called number of a telephone call on said subscriber line, said called number including a number plan area code and a central office code, the method including the steps of:
   a) processing said call at a service switching point connected to said subscriber line, according to a first call model associated with a first telephone service type when said called number has a numbering plan area code meeting a first criteria;
   b) terminating processing of said call according to said first call model when at least a portion of said numbering plan area code and at least a portion of said central office code meet a second criteria;
   c) assigning a dummy routing code to said call, said dummy routing code being operable to control call processing under a second call model associated with a second telephone service type; and
   d) re-initiating processing of said call at said service switching point, according to said second call model.

2. A method of selecting telephone service types on a subscriber line in response to a called number of a telephone call on said subscriber line, said called number including a number plan area code and a central office code, the method including the steps of:
   a) processing said call at a service switching point connected to said subscriber line, according to a first call model associated with a first telephone service type when said called number has a numbering plan area code meeting a first criteria;
   b) terminating processing of said call according to said first call model when at least a portion of said numbering plan area code and at least a portion of said central office code meet a second criteria;
   c) assigning a dummy routing code to said call, said dummy routing code being operable to control call processing under a second call model associated with a second telephone service type; and
   d) re-directing said call processing to proceed according to said second call model.

3. A method as claimed in claim 2 further including the step of initiating call processing according to said first call model when said numbering plan area code matches a predefined value.

4. A method as claimed in claim 2 further including the step of terminating call processing according to said first call model and continuing call processing according to said second call model when said called number includes a sequence of digits within at least one predefined range of digits.

5. A method as claimed in claim 4 further including the step of terminating call processing according to said first call model and initiating call processing according to said second call model when said numbering plan area code is equal to a predefined value and said called number includes a sequence of digits within a predetermined range.

6. A method as claimed in claim 5 wherein the step of assigning said dummy code includes assigning a dummy code operable to permit said call processing to proceed through a call checking algorithm of said second call model.

7. A method as claimed in claim 6 further including the step of re-directing said call to said second call model at a point in said second call model after a number to route translation function in said second call model.

8. An apparatus for selecting telephone service types on a subscriber line in response to a called number of a telephone call on said subscriber line, said called number including a number plan area code and a central office code, the apparatus comprising:
   a) a service switching point having subscriber line termination equipment for terminating said subscriber telephone line;
   b) a called number buffer in said subscriber line termination equipment for receiving and storing a called telephone number from said subscriber telephone line in response to said telephone call on said subscriber telephone line;
   c) a processor in communication with said called number buffer and programmed to:
      i) read said numbering plan area code from said called number buffer and to determine whether or not said numbering plan area code meets a first criteria;

ii) process said call according to a first call model associated with a first telephone service type, when said numbering plan area code meets said first criteria;

iii) terminate processing according to said first call model when at least a portion of said numbering plan area code and at least a portion of said central office code of said called number meet a second criteria;

iv) assign a dummy routing code to said call, said dummy routing code being operable to control call processing under a second call model associated with a second telephone service type; and v) process said call according to said second call model.

9. An apparatus as claimed in claim 8 wherein said processor is programmed to initiate call processing according to said first call model when said numbering plan area code matches a predefined value.

10. An apparatus as claimed in claim 8 wherein said processor is programmed to terminate call processing according to said first call model and continue call processing according to said second call model when said called number includes a predefined sequence of digits within at least one predefined range of digits.

11. An apparatus as claimed in claim 10 wherein said processor is programmed to terminate call processing according to said first call model and continue call processing according to said second call model when said numbering plan area code and said numbering plan area code is equal to a predefined value and said called numbering includes a sequence of digits within a predetermined range.

12. An apparatus as claimed in claim 11 wherein said processor is programmed to associate with said call a dummy code operable to permit said call processing to proceed through a call checking algorithm of said second call model.

13. An apparatus as claimed in claim 12 wherein said processor is programmed to re-direct said call to said second call model at a point in said second call model after a number to route translation function in said second call model.

* * * * *